UNITED STATES PATENT OFFICE.

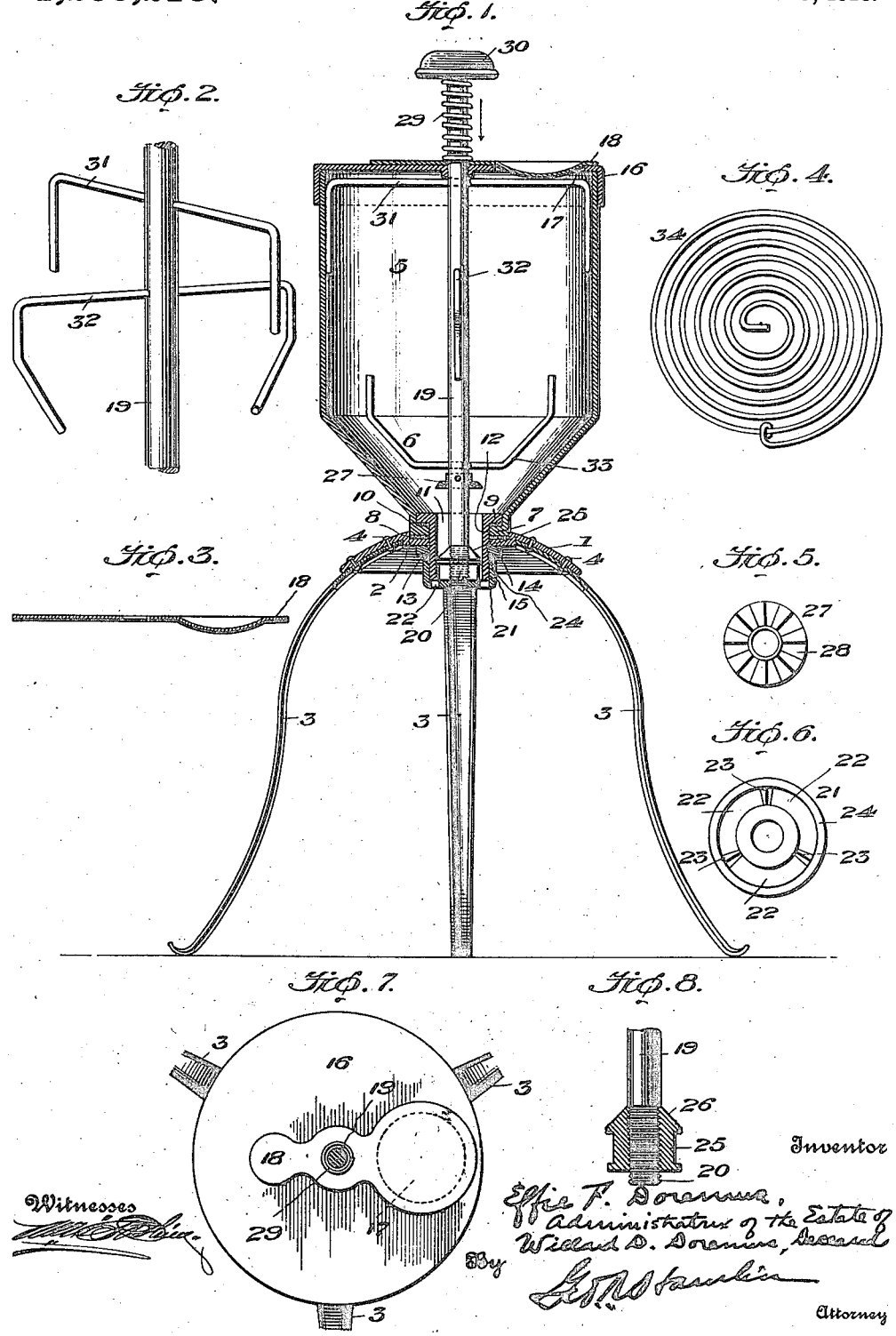

WILLARD D. DOREMUS, DECEASED, LATE OF WASHINGTON, DISTRICT OF COLUMBIA, BY EFFIE F. DOREMUS, ADMINISTRATRIX, OF WASHINGTON, DISTRICT OF COLUMBIA.

DISPENSING DEVICE.

1,253,218.      Specification of Letters Patent.     Patented Jan. 15, 1918.

Application filed November 10, 1915. Serial No. 60,730.

*To all whom it may concern:*

Be it known that WILLARD D. DOREMUS, deceased, late a citizen of the United States, residing at Washington, in the District of Columbia, did invent a new and useful Dispensing Device, of which the following is a specification.

This invention relates to dispensing devices.

This invention has for its object the provision of a simple, inexpensive and efficient device adapted for dispensing granulated or loose materials in measured quantities and is particularly designed for dispensing granulated sugar, being constructed and adapted for use in restaurants, lunch rooms and other public eating places where it is desired to keep sugar sealed against contamination by flies and the hands of patrons and to economically, yet satisfactorily, dispense the requisite quantity of granulated or powdered sugar required for a cup of coffee, tea, or other beverage.

The invention embodies improvements whereby the hopper or receptacle for containing the sugar or other material to be dispensed can be readily filled and inspected and kept closed at all other times; further, improvements are provided by which any material adhering to the walls of the hopper or container may be freed therefrom without opening the container and by which the act of operating the device to dispense a measured quantity of material therefrom, automatically and incidentally to such operation, causes the material within the hopper to be agitated, stirred or prevented from clogging or adhering to the walls of the container.

The invention contemplates, still further, the provision of improvements in the dispensing valve and cutoff, whereby a measured, and substantially the same, quantity of sugar or other material will be dispensed each time the device is operated, and sprayed so that it will suitably enter the cup of coffee or other beverage without resulting in splashing, thus insuring an even distribution; still further improvements reside in the coupling and valve casing, whereby the container and its supporting stand or legs are detachably connected together, preventing accumulation of the material in any joint and permitting ready detachment when desired.

The nature and objects of the invention not hereinbefore set forth will appear more fully from the following detailed description of one embodiment of the invention, which is to be considered as illustrative, rather than restrictive, of the scope thereof, and in the appended claims and accompanying drawings, in which—

Figure 1 is a vertical section of the complete device, certain parts being in full lines;

Fig. 2, a detail perspective of the upper portion of the stem and agitators or stirrers;

Fig. 3, a detail longitudinal section of the closure;

Fig. 4, a plan view of a modification of the lower agitator and stop;

Fig. 5, a bottom face view of the cut-off;

Fig. 6, a top view of the spreader;

Fig. 7, a plan view of the complete device; and

Fig. 8, a detail of the valve.

A convex base 1 which is provided with a depressed or countersunk circular portion 2 in its top, is supported by legs 3 suitably fastened to the base plate at 4. The receptacle, hopper, or container 5 for the powdered, or granulated, sugar may be of any preferred shape, but is preferably provided with a contracted or conical lower portion 6 which has a cylindrical projecting bottom 7 adapted to snugly fit within the concavity 2 and to rest upon packing 8. A valve casing and coupling which has a head 9 fitted within the bottom 7 and resting on packing 10, has a cylindrical, tubular portion 11 which tightly fits and extends through an opening 12 in the bottom 7 and a corresponding opening in the base 1 and is provided with screw-threads 13 engaged by a nut 14, the latter bearing against the under side of the base 1 and serving as a means to tightly connect the container 5 to said base. The packing 8 and 10 forms a tight joint, excluding moisture at the dispensing portion of the device. The lower portion of the valve casing 11 is externally smooth and unthreaded at 15.

The container 5 is preferably of glass or transparent material so that ready inspection of the interior may be had at all times, and the operation or condition of the contents may be easily inspected. The container may be of metal, if preferred.

A cap 16 fits tightly, yet removably, over the upper open end of the container and is provided with a filling opening 17 which is covered by a closure 18. On swinging the closure 18 aside, the receptacle 5 may be filled, or inspected, without having to remove the cap 16.

The stem 19 which carries the operative parts of the device, passes loosely through the closure 18 and cap 16 and is provided at its lower end with a screw-threaded portion 20. Screwed on the threaded portion 20 is an annular spreader and guide 21 which telescopes over the smooth, lower end of the valve casing and coupling 11 and is provided with openings 22 in its base which are separated by webs 23 that are substantially triangular in cross section, each having an apex or edge on its upper face, thus insuring the spreading of the flow of sugar as it issues from the tubular portion 11 and directing it into the spaces 22. The upper edge of the spreader is beveled at 24, serving as an additional spreading means when the spreader 21 is depressed below the lower edge of the coupling and valve casing 11.

Carried by the screw-threaded portion 20, above the spreader 21, is a valve 25 which has a coned upper end 26 and against whose lower face the hub of the spreader 21 abuts. The relationship of the cone 26 to the upper edge 24 and the spreading edges of the webs 23 is such that the measured quantity of sugar contained within the valve casing 11 is spread outwardly in a sheet and directed to the edge 24 and the edges of the webs 23 and is sprayed, as it were, into the cup of coffee, for instance, which may be set in between the legs 3 below the spreader, thus insuring free delivery of the sugar without resulting in splashing in the cup of coffee into which the sugar is discharged. Carried by the stem 19 is a cut-off 27 which is provided with a "rose" or toothed lower face 28 and is of a diameter adapting it to enter the upper open end of the valve casing and coupling 11 just prior to or approximately at the time that the cone valve 25 is opening to discharge the measured quantity of sugar contained within the valve casing 11, thereby cutting off further flow from the container 5 into the valve casing. On the upward lift of the stem 19 by the expansion of spring 29, which surrounds the stem between the closure 18 and the detachable operating head 30, the parts are retracted to the position shown in Fig. 1. The spring 29 holds the closure 18 in place and yet permits it to be swung to one side or the other to enable filling of the container to be had. The operating head 30 is preferably screwed onto the stem 19 so that it can be taken off when desired.

The stem 19 carries the stirrers or agitators 31, 32 and 33. The upper and lower ones 31 and 33 may be in the same general plane and the agitator 32 disposed at an angle thereto. The uppermost stirrers or agitators 31 and 33 are adapted to easily engage the walls of the container or receptacle 5 so that on turning the stem 9 by manipulation of the head 30, they may be employed to scrape adhering material from the walls of the container or receptacle. On depression of the stem 19, these agitators or scrapers perform a scraping operation and they also tend to stir up the contents of the receptacle 5 when the stem 9 is either depressed or turned. The act of pressing down on the head 30 for the purpose of dispensing the sugar involuntarily accomplishes a twisting or turning action which tends, through the usual use of the device, to prevent adhesion of the material to the walls of the receptacle and also to stir the contents thereof. The lower stirrer or agitator 33 is adapted to operate within the conical bottom 6 to agitate the contents thereof and clear its walls of adhesions of materials. The agitator 33 also serves as a stop adapted to engage the conical portion 6 to limit the downward play of the stem 19 when the dispensing operation is being carried on.

In Fig. 4, there is shown a spiral agitator of resilient wire 34 which may be substituted for the agitator and stop 33.

Having thus described the invention, what is claimed as new and desired to be secured by Letters Patent, is:—

1. In a dispensing device, the combination with a container having a dispensing outlet, of a spring-retracted reciprocatable and rotatable stem movable in relation thereto, a combined measuring and cut off valve operated thereby controlling the dispensing outlet, and stirrers or agitators carried by said stem within the container adapted to reciprocate and rotate with said stem.

2. In a dispensing device, the combination with a container having a dispensing outlet, of a spring-retracted reciprocatable and rotatable stem, a combined measuring and cut off valve operated thereby controlling the dispensing outlet, and stirrers or agitators carried by said stem within the container having angular end portions substantially engaging with the interior wall thereof adapted to dislodge material adhering to said wall by the combined reciprocation and rotation of said stirrers.

3. In a dispensing device, the combination with a container having a tapered bottom portion and dispensing outlet therefor, of a spring-retracted rotatable and reciprocatable stem, a valve operated thereby controlling the dispensing outlet, and a combined stirrer and stop carried by the stem and adapted for engagement with the walls of said tapered bottom portion, and to reciprocate and rotate within said bottom and to engage with and scrape the latter when the stem is depressed and turned.

4. In a dispensing device, the combination with a container having a tapered bottom portion and dispensing outlet therefor, of a spring-retracted, rotatable and reciprocatable stem, a valve operated thereby controlling the dispensing outlet, a combined stirrer and stop carried by the stem and adapted for engagement with the walls of said tapered bottom portion, and to reciprocate and rotate within said bottom, and to engage with and scrape the latter when the stem is depressed and turned, and freely projecting stirrers carried by the stem operating in the container above the aforesaid combined stirrer and stop and having angular ends, said stirrers being adapted to rotate with the stem and to scrape the walls of the container.

5. In a dispensing device, the combination with a container having a valve casing whose interior communicates with the container and whose outer end serves as a dispensing outlet for said container, of an operating stem, a valve carried thereby controlling the outlet of said valve casing, and a combined spreader and guide carried by said stem and telescoping over the outer end of the valve casing.

6. In a dispensing device, the combination with a container having a valve casing whose interior communicates with the container and whose outer end serves as a dispensing outlet for said container, of an operating stem, a valve carried thereby controlling the outlet of said valve casing, and a combined spreader and guide carried by said stem and telescoping over the outer end of the valve casing, said combined spreader and guide having discharge openings and edged spreading webs at its bottom.

7. In a dispensing device, the combination with a container having a valve casing whose interior communicates with the container and whose outer end serves as a dispensing outlet for said container, of an operating stem, a valve carried thereby controlling the outlet of said valve casing, said valve having a spreading cone, and a combined spreader and guide carried by said stem and telescoping over the outer end of the valve casing, said combined spreader and guide having discharge openings and edged spreading webs at its bottom.

In testimony whereof, I hereunto affix my signature.

EFFIE F. DOREMUS,
*Administratrix of the estate of Willard D. Doremus, deceased.*